Figure 1:
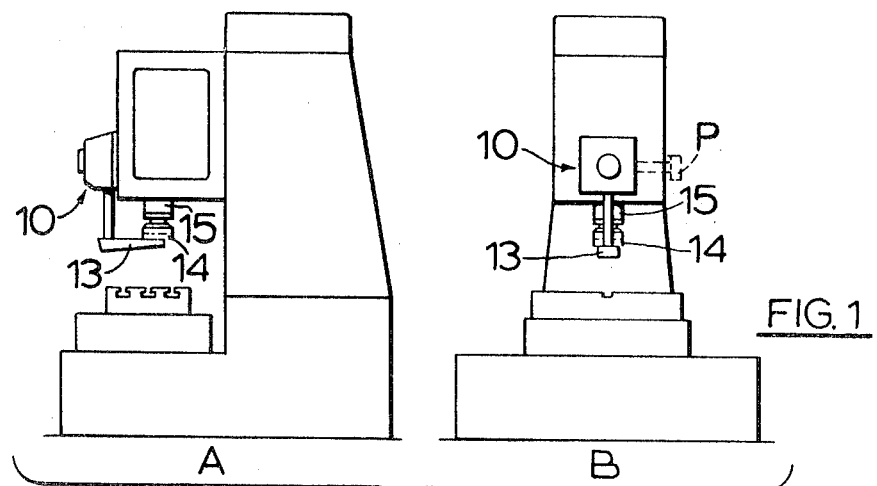

United States Patent

[11] 3,587,360

| [72] | Inventor | John Oxenham<br>Boorley Green, near Botley, England |
|---|---|---|
| [21] | Appl. No. | 793,283 |
| [22] | Filed | Jan. 23, 1969 |
| [45] | Patented | June 28, 1971 |
| [73] | Assignee | Vero Precision Engineering Ltd.<br>Regent's Park, Southampton,<br>Hampshire, England |
| [32] | Priority | Jan. 25, 1968 |
| [33] | | Great Britain |
| [31] | | 3953/68 |

[54] TOOL LENGTH MEASURING DEVICES FOR USE WITH MACHINE TOOLS
7 Claims, 11 Drawing Figs.

[52] U.S. Cl.................................................. 77/5,
77/25, 90/11, 29/26, 29/568, 235/151.11, 29/40, 82/34
[51] Int. Cl........................................................B23b 49/00,
B23q 3/157

[50] Field of Search.......................................... 77/1, 25, 5;
33/(Inquired); 90/11.1; 235/151.11;
73/(Inquired); 83/(Inquired); 82/(Inquired);
29/26, 568

[56] References Cited
UNITED STATES PATENTS
3,492,467   1/1970   Caban et al...................   77/25X

*Primary Examiner*—Francis S. Husar
*Attorney*—Watson, Cole, Grindle and Watson

ABSTRACT: A numerically controlled machine tool which includes a tool length measuring unit which measures each tool inserted into a spindle of the machine and converts the length measurement into an electrical signal which is fed into the control system of the machine to ensure that the travel of the tool during a cutting operation will conform exactly with that desired by the programmer of the machine.

TOOL LENGTH MEASURING DEVICES FOR USE WITH MACHINE TOOLS

This invention relates to numerically controlled machine tools, i.e. machine tools of the type comprising an automatic control system for programming the sequential operation on a workpiece of a plurality of tools and determining the distance of advance of each tool towards the workpiece from its initial position.

In existing machine tools of this type the control system is numerically controlled by a punched tape, magnetic tape or other data storage means, or by a manually dialed input to provide a variable program of operation, and includes a demand position store in which an electrical signal representative of a demanded distance of advance of each tool towards and into the workpiece is entered, a measuring element store into which is entered, during advance of the tool, an electrical signal representative of the position of the tool, and a comparitor which compares the signals in the two stores and stops the advance of the tool when the signals become identical. The signal entered in the demand position store is calculated upon the basis of an assumed length of projection of the tool from its spindle. For accuracy therefore, it is necessary that each individual tool shall project from the spindle carrying it by a definite distance. Extensive work is therefore involved in presetting the required tools to a prescribed length so as to ensure that when it is necessary to exchange a worn tool for another the machine will continue to operate to the same standard of accuracy. Errors can, moreover, arise as the result of thermal expansion or inaccurate location of a tool in its spindle.

The invention provides a numerically controlled machine tool which includes a length measuring unit operable to measure, after a tool has been inserted into a spindle, the distance between the tip of the tool and a fixed datum position, a transducer which converts each length measurement into an electrical signal and means in the control system for comparing with a signal in a demand position store the algebraic sum of the signal in a measuring element store and the signal provided by the transducer. As an alternative the length of the tool may be measured while it is in the magazine of an automatic tool changer awaiting transfer to the spindle.

When such a length measuring unit is provided, the signal entered in the demand position store represents the distance between the datum position and the final position of advance of the tool and is thus independent of the length of the tool. The datum position may be the end face of the spindle, in which case, as explained in more detail below, the measuring unit is utilized to measure the length of tool projecting from the spindle and the distance of advance of the tool is the arithmetic difference between the programmed dimension and the measured dimension. Alternatively, the datum position may be a position spaced from the face of the spindle by a distance equal to or slightly greater than the length of the longest tool. In this case the measuring unit measures the distance between this position and the tip of the tool and the distance of advance of the tool is the arithmetic sum of the programmed dimension and the measured dimension.

Figure 2:
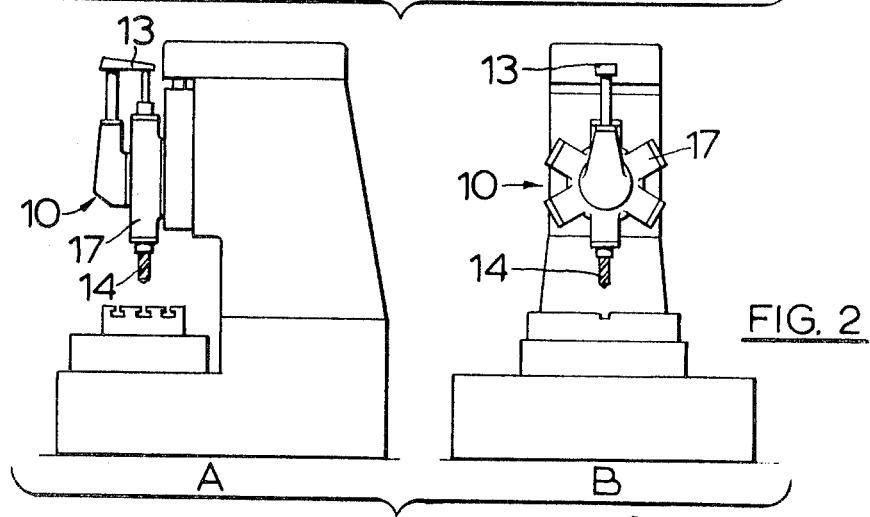
Figure 3:
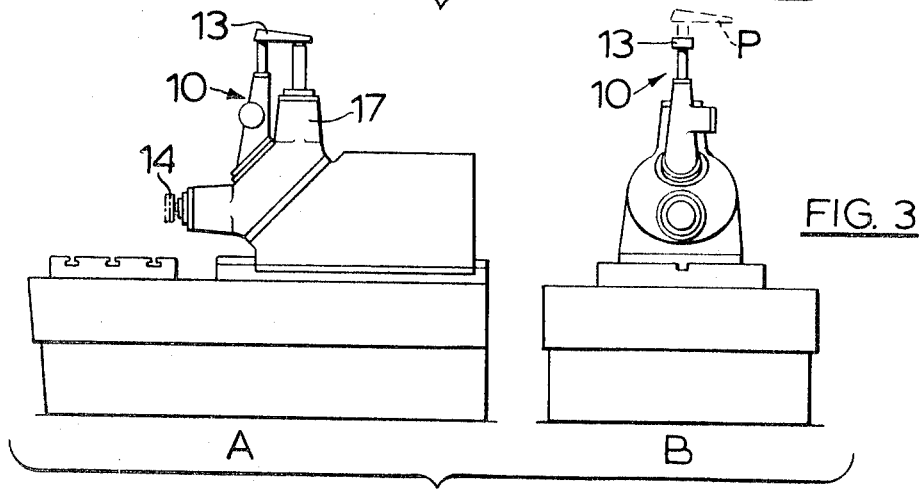
Figure 4:
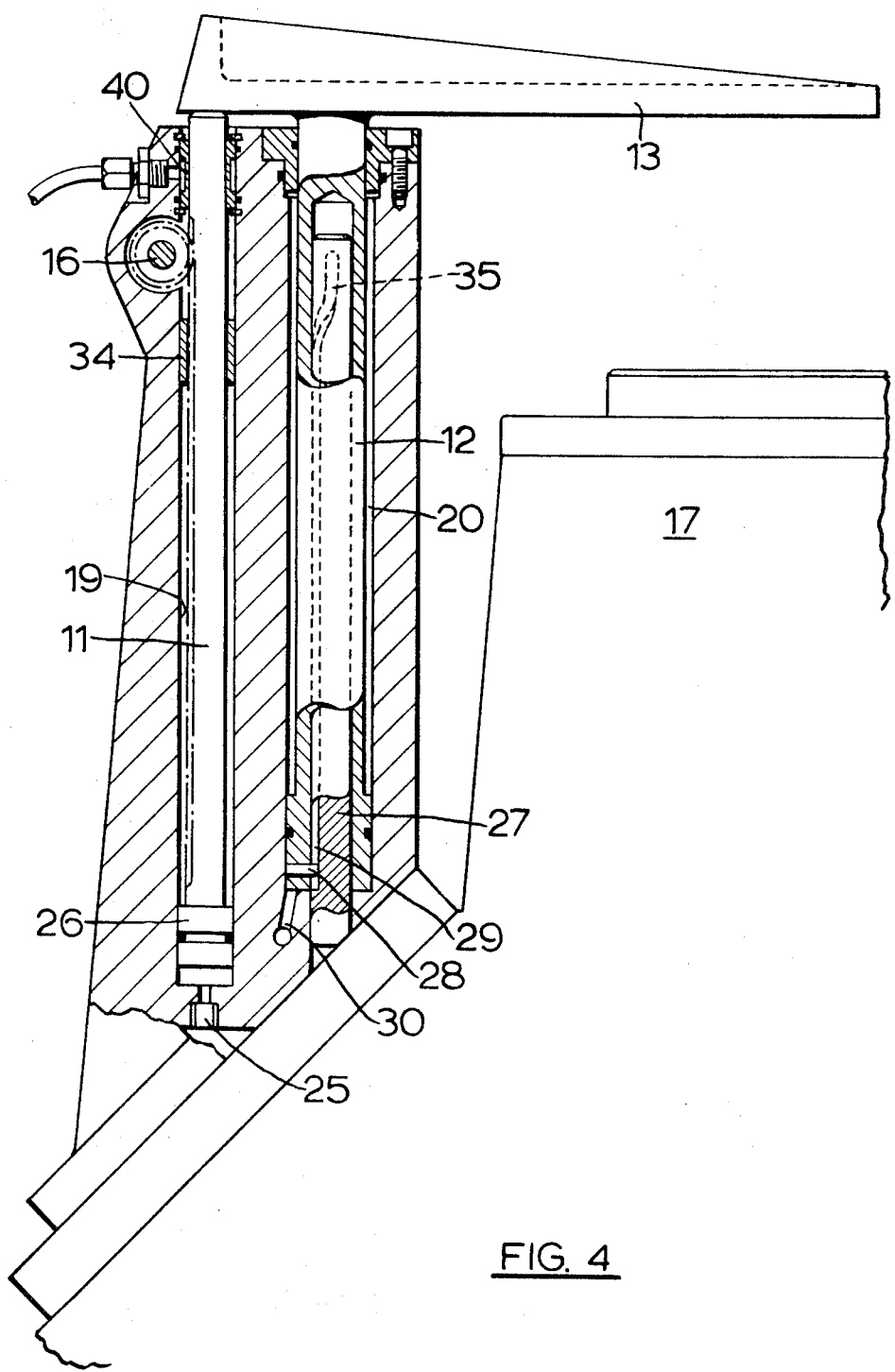
Figure 5:
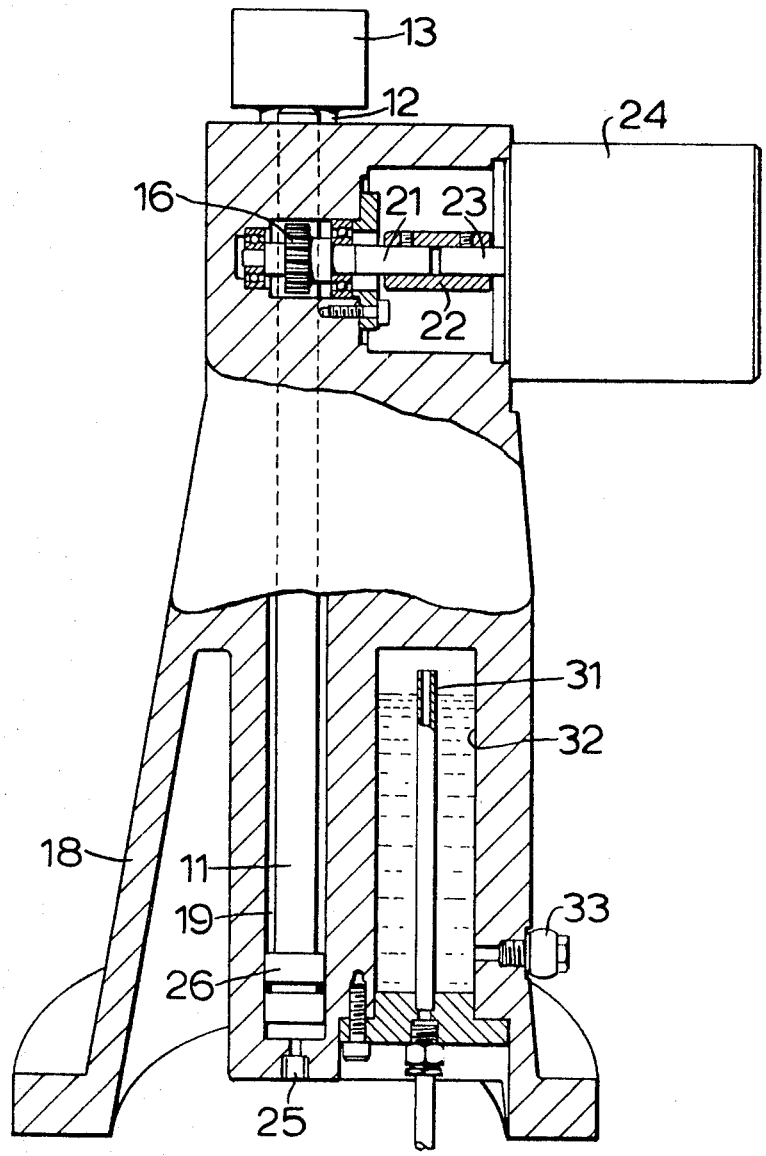
Figure 6:
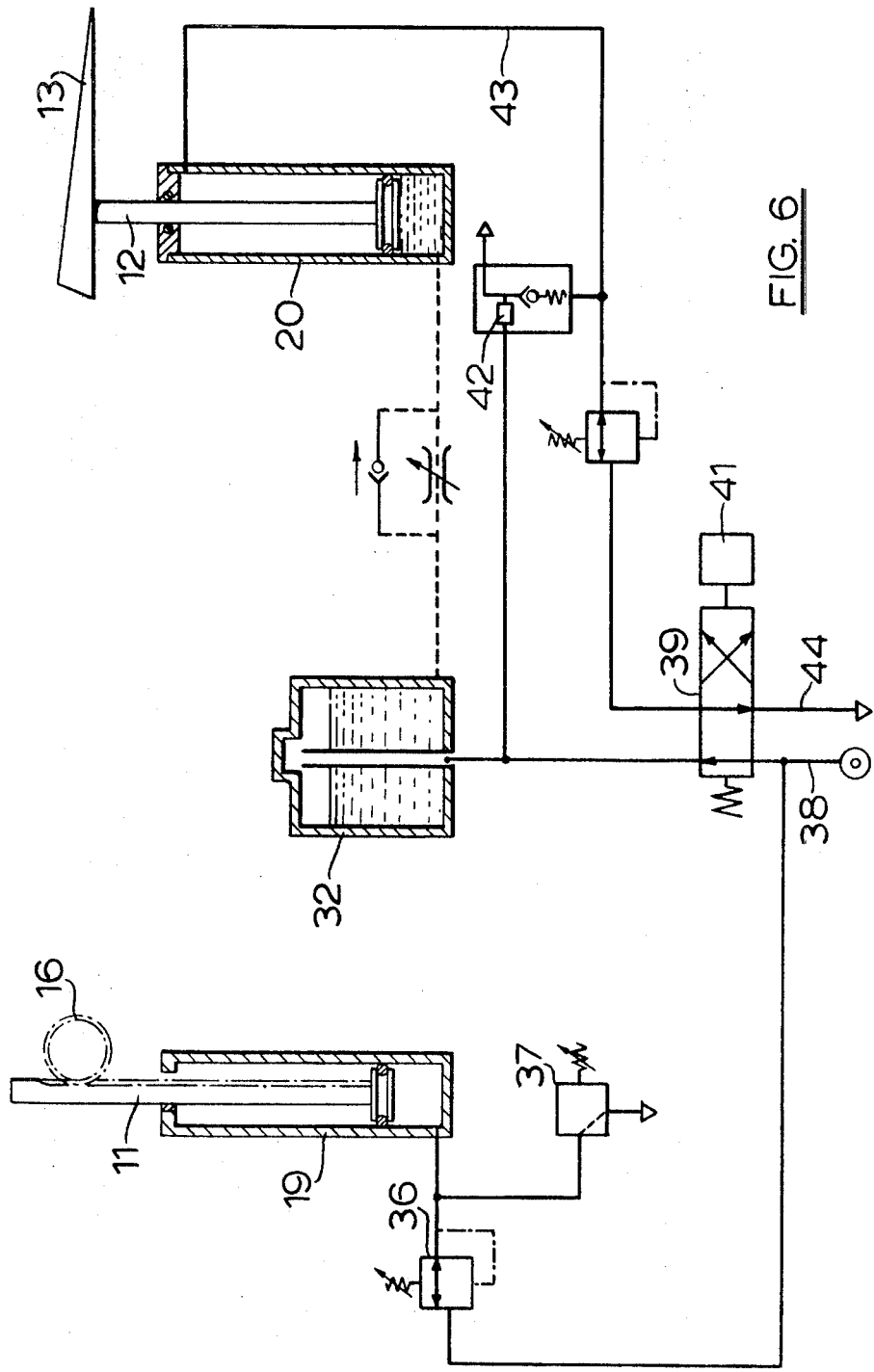
Figure 7:
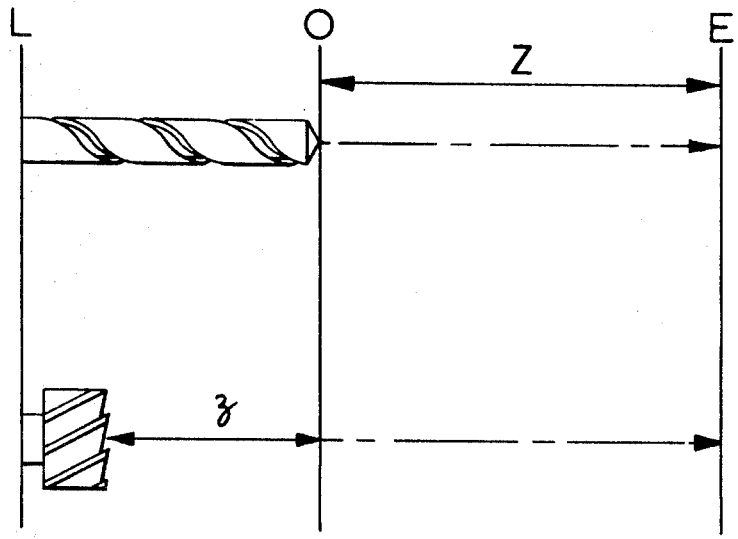
Figure 11:
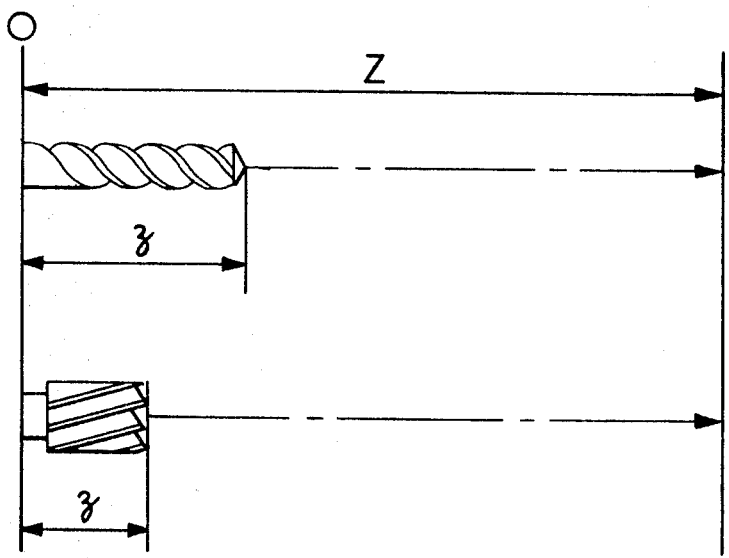
Figure 8:
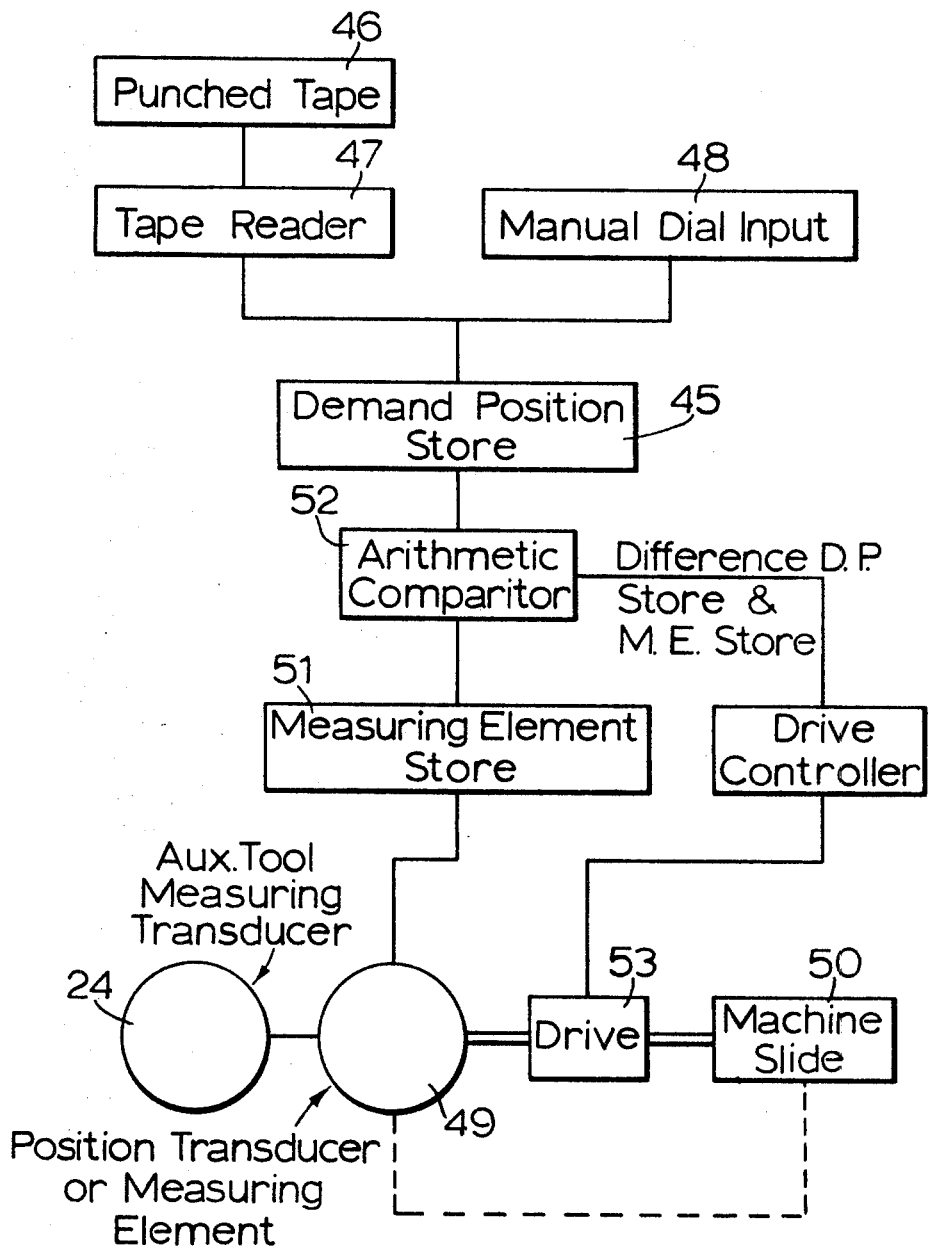
Figure 9:
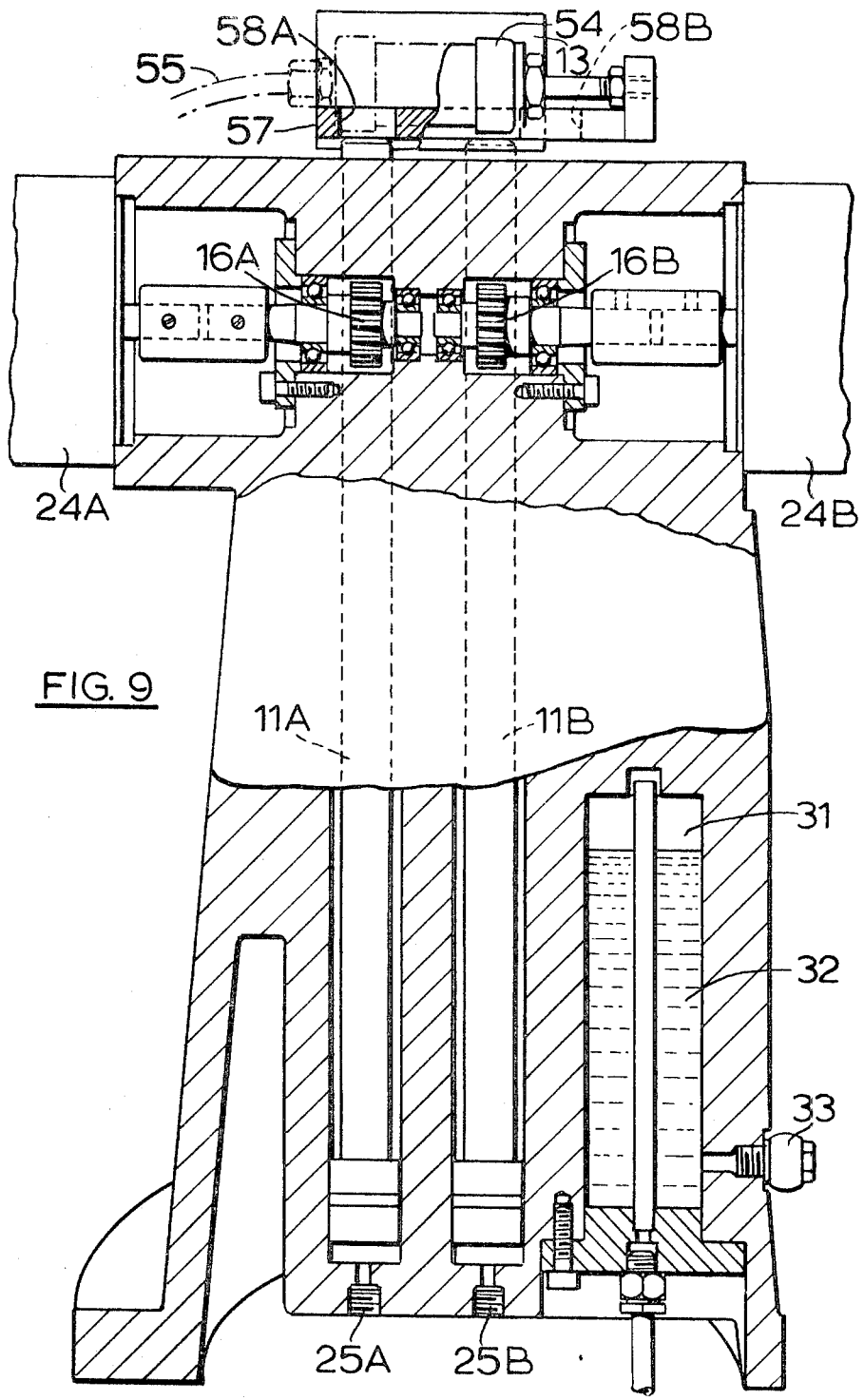
Figure 10:
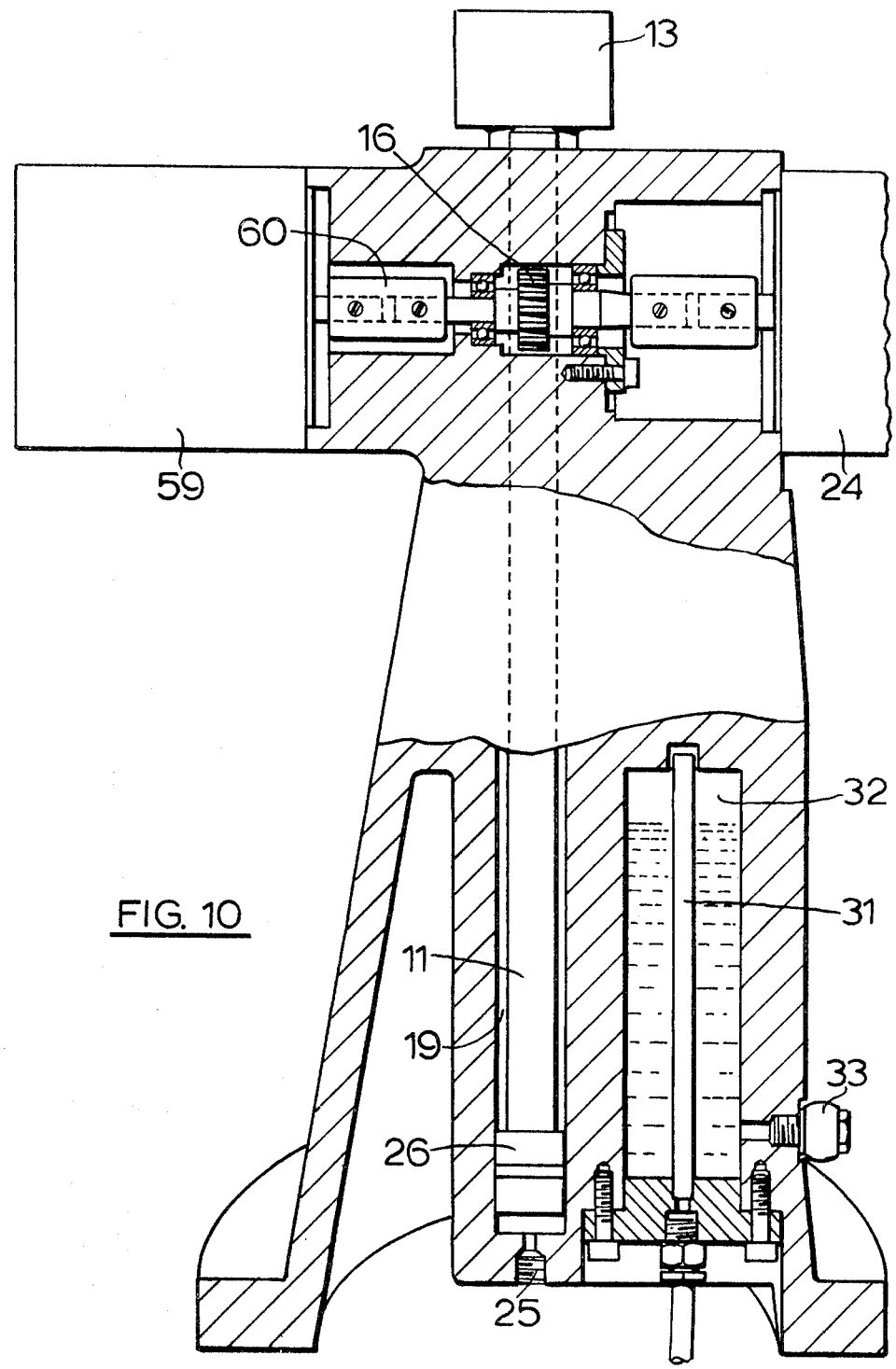

The invention will now be further described with reference to the accompanying drawings, in which:

FIGS. 1—3 are diagrams showing a tool measuring unit according to the invention applied to three different machine tools shown in each case in side elevation at A and in front elevation at B, FIG. 4 is a front elevation, partly in section of the tool measuring unit illustrated in FIG. 3, FIG. 5 is a corresponding side elevation, also partly in section, FIG. 6 shows the hydraulic circuit for the measuring device shown in FIGS. 4 and 5, FIG. 7 is a diagram illustrating the datum position of the measuring unit shown in FIGS. 4 and 5, FIG. 8 is a block diagram of a control system appropriate for use with a length measuring unit according to the invention, FIG. 9 is a view similar to FIG. 5 showing an alternative form of length measuring unit, FIG. 10 is a similar view illustrating another form of length measuring unit, and FIG. 11 is a diagram illustrating the datum position of the length measuring unit shown in FIG. 10.

Like reference numerals indicate like parts throughout the FIGS.

As shown in FIGS. 4 and 5 the tool measuring unit 10 according to the invention consists, in basic principle, of a rack 11 reciprocable under control of a ram 12 carrying an arm 13 adapted to cooperate with the end of a tool 14 mounted in a spindle 15. The rack 11 meshes with a pinion 16 which, as later described, serves in conjunction with a transducer 24 to feed into the control system of the machine tool electrical signals representative of the measured length between a datum position and the tip of the tool.

FIG. 1 shows such a measuring unit 10 applied to a machine tool having a single spindle and requiring manual tool change. In such a case the unit 10 can be operated manually, immediately after the tool 14 has been fitted into the spindle, or automatically by the control system when the machine is restarted after fitting a fresh tool in position The unit 10 is moved between measurements to the parked position P indicated in chain lines.

FIG. 2 shows the measuring unit 10 applied to a machine tool having an indexing turret 17 carrying six spindles which are brought successively into the working position by the control system. In this case the unit 10 is situated at a tool changing position and is operated automatically by the control system to measure the tool 14 in the upwardly facing spindle of the magazine while the tool in the downwardly facing spindle is machining. The electrical indication of tool length provided by the unit 10 is stored in the control system and released for use when the measured tool is brought to the machining position. No time is wasted during measurement of the tool as this measurement is made before the tool is moved to the machining position.

FIG. 3 shows the measuring unit applied to a machine tool in which the turret 17 has two spindles which are moved alternately to the working and the tool changing and measuring positions. Again one tool is changed automatically and thereafter measured while the other tool is machining and the information from the measuring unit is stored for use when required.

In the case both of FIGS. 2 and 3 provision is made, as described below, for swinging the length measuring unit into a parked position when it is fully retracted from the tool so as not to impede tool changing by an automatic tool change mechanism, not shown.

FIGS. 4 and 5 show in detail the tool measuring unit utilized in the machine tool shown in FIG. 3. It comprises a column 18 mounted on the turret 17 and formed with two cylinders 19, 20, the former containing the rack 11 and the latter the ram 12. The pinion 16 is fixed to a shaft 21, connected by a coupling 22 to the shaft 23 of a transducer 24, which gives an electrical signal representative of the angular position of the pinion 16 and therefore of the distance of travel of the rack 11. The rack 11 is urged upwardly by air pressure applied through an inlet 25 to a piston 26 on its lower end.

The arm 13 is fixed to the upper end of the ram 12 which is hollow and slides on a fixed rod 27. The ram 12 is raised by admission of air under pressure to an inlet pipe 31 and lowered by admission of air under pressure to the top of the cylinder 20. Upon admission of air under pressure to the pipe 31, liquid is forced out of a hydraulic reservoir 32 and through a banjo union 33 to an inlet 30 at the bottom of the cylinder 20 to cause the ram 12 to ascend.

Upon upward movement of the ram 12, the rack 11 follows it being moved upwardly by the air pressure on the undersurface of the piston 26 until the piston 26 abuts against a stop collar 34. The ram 12 continues to move upwardly, the arm 13 lifting clear of the upper end of the rack 11 and the ram 12 and the arm 13 being rotated through 90° to the parked position indicated at P in FIG. 3 by coaction of the pin 28 with a spiral formation 35 in the groove 29.

On descent of the ram 12 from its topmost position, the ram 12 and the arm 13 are rotated back through 90° from the parked to the operative position by the pin 28, the arm 13 entrains the upper end of the rack 11, and the rack 11 moves down with the ram 12 until the downward movement is arrested by contact of the arm 13 with the tool. A hydraulically operated clamp 40 is provided for locking the rack 11 in the position which it assumes after a measuring operation for a purpose described later.

As shown in FIG. 6, air under pressure is admitted to the lower end of the cylinder 19 from a pressure line 38 through a pressure control valve 36, the pressure applied to the lower end of the rack 11 being determined by a pressure relief valve 37. The admission of air under pressure to the oil reservoir 32 is controlled by a valve 39 operated by a solenoid 41. In the position shown air is passing from the line 38 into the oil reservoir 32 to cause oil to lift the ram 12. The air pressure from the line 38 opens a pilot valve 42 to connect to exhaust the line 43 leading from the top of the cylinder 20. When the valve 29 is reversed by the solenoid 41, the valve 42 closes and the pressure line 38 is connected to the line 43 to cause the ram 12 to descend and the oil reservoir 32 is connected to the exhaust line 44.

The line L in FIG. 7 represents the end face of the spindle, the line 0 the datum position of the tool measuring unit of FIGS. 4 and 5, i.e. the position in which the rack 11 is at the top of its stroke and the line E the end position of the tool after it has completed its travel into the workpiece. Z represents the programmed dimension set up in the control system and $z$ the dimension measured by the measuring unit. The total distance of travel of the tool is accordingly $Z+z$. The datum position 0 is coincident with the position of the tip of the longest tool shown at the top of FIG. 7, and the distance $z$ measured for this tool is therefore zero.

As shown in FIG. 8, an electrical signal representative of the dimension Z is set up in a demand position store 45, either from punched tape 46 through the agency of a tape reader 47 or by a manual dial input 48. The signals from the measuring transducer 24 and from a transducer 49 which measures the position of the machine slide 50 carrying the spindle are combined and entered in a measuring element store 51. An arithmetic comparitor 52 measures the difference between the signals in the stores 45 and 51, and, so long as a difference exists, causes a motor 53 to advance the slide 50, the movement ceasing when the signal in the store 51 becomes equal to that set up in the store 45.

The transducers 24, 49 may be of the digital type emitting pulses representing by their number the distance of travel of the measuring arm and of the machine slide, the algebraic sum of the pulses being entered in the store 51, which is then a counter, and compared with the number of pulses entered in the store 45. Alternatively the transducers may be of the analogue type and generate electrical signals, e.g. voltages, representative of position which are compared with corresponding demand signals in the store 45.

If the machine is a multispindle machine and it is desired to store the signal provided by the transducer 24 upon measurement of a tool at the loading station for use later when the tool reaches the cutting station, this may be done by applying the clamp 40 (FIG. 5) provided the transducer 24 is of the analogue type. When the transducer 24 is of the digital type, the control system may include an auxiliary tool transducer store which counts the pulses from the transducer 24 and feeds them when required directly into the comparitor 52.

Alternatively the measuring unit may include twin measuring racks and associated transducers which operate alternately and the control system may include a switch for connecting to the measuring element store 51 while a tool is cutting the transducer of the rack which measured it previously while at the loading station. Such arrangement is shown in FIG. 9, in which the racks are shown at 11A and 11B, the corresponding pinions at 16A and 16B and the corresponding transducers at 24A and 24B.

A cylinder 54 attached to the arm, not shown, but corresponding to the arm 13 in FIG. 4, contains a spring-returned piston which can be moved, by admission of air to the cylinder through a line 55, to project its piston rod 56 to the position shown in FIG. 9. The piston rod carries a slide 57 formed with two slots 58A, 58B. In the position shown, the slot 58A is opposite the rack 11A so that depression of the arm will operate the rack 11B only. When the air pressure in the cylinder 54 is relieved, the slide 57 shifts to its other position, bringing the slot 58B opposite the rack 11B, so rendering the rack 11A only effective to respond to depression of the arm.

The alternative form of length measuring unit shown in FIG. 10 differs from that of FIGS. 4 and 5 in that it includes an air motor 59 coupled to the pinion 16 by a coupling 60. While a tool is being gauged by the arm 13, air is admitted to the motor 59 which maintains the rack 11 in a bottom datum position in which its head 20 contacts the lower end of the cylinder 19. After gauging has been completed, the air pressure is released from the motor 59 and the rack 11 is raised by the air pressure beneath it until it is arrested by the arm 13. In this case the transducer 24 produces a signal representative of the length of the tool.

In this case, as indicated in FIG. 11, the datum position is coincident with the end face of the spindle and the programmed dimension Z is the arithmetical sum of the measured dimension $z$ and the distance of advance of the tool.

While the signal provided by the measuring transducer 24 has been described as applied to the arithmetic comparitor 52, either directly or jointly with that from the position measuring transducer, it could also be applied as a correcting factor to the demand position store.

I claim:

1. In a numerically controlled machine tool, a length measuring unit for measuring the distance from a fixed datum position of the tip of a tool held in said machine tool, sad unit comprising an arm extending transversely to the tool, a rack mounted to slide in a direction parallel to the axis of the tool and constrained to remain in a datum position during movement of the arm towards the tool, means for advancing the rack towards and into contact with the arm after the latter has been arrested by contact with the tool, and a pinion meshing with the rack and coupled to the transducer.

2. A numerically controlled machine tool comprising a turret movable to bring spindles carried by said turret alternatively to a tool changing and to a working position, driving mechanism for advancing into a workpiece a tool in the spindle at the working position, a length measuring unit operable to measure, during machining of this workpiece by the tool in the spindle at the working position, the distance between a fixed datum position and the tip of a tool in the spindle at the tool changing position, said length measuring unit including an arm and means for moving said arm from a remote position towards said tool until said arm is arrested, by contact with the tip of said tool, and an electrical control system including a length transducer which converts each length measurement made by the length measuring unit into an electrical signal, a demand position store for storing signals representing demanded distances of advance of said tools, a position transducer which generates signals representing the extent of advance of the tool at the working position and means for automatically terminating operation of said driving mechanism when the algebraic sum of the signal from the two transducers becomes equal to the signal in the demand position store.

3. In a numerically controlled machine tool, a length measuring unit for measuring the distance from a fixed datum position of the tip of a tool held in said machine tool, said unit comprising an arm extending transversely to the tool and movable towards and into contact with the tip of the tool, a rack constrained to move with the arm from a datum position in a direction parallel to the axis of the tool until the arm is arrested by contact with the tool, a pinion meshing with the rack and a transducer coupled to the pinion and effective to convert into electrical signals length measurements made by said unit.

4. In a numerically controlled machine tool, a length measuring unit as claimed in claim 3, wherein the arm is mounted on a fluid-pressure operated ram extending parallel to the rack.

5. In a numerically controlled machine tool, a length measuring unit as claimed in claim 4, in which the rack is biased into contact with the arm so as to partake of movement of the arm towards and away from the tool and which includes a stop for limiting the travel of the rack under its bias on movement of the arm away from the tool and means for rotating the ram about its axis to swing the arm into a parked position after the rack has reached the stop and for effecting reverse rotation of the ram to return the arm to operative position on the return stroke of the ram.

6. In a numerically controlled machine tool, a length measuring unit as claimed in claim 3, which includes a clamp for retaining the rack in the position to which it has been moved by the arm during the length of measurement.

7. In a numerically controlled machine tool, a length measuring unit as claimed in claim 3, which includes two racks, each meshing with a pinion coupled to an individual transducer, means for selectively coupling the racks to the arm so that one rack only partakes of the movement of the arm towards the tool, said machine tool having a control system including means for reading the signal generated by the transducer of one rack while the transducer of the other rack is partaking of a length movement.